D. HIMES.
HAND PLOW.
APPLICATION FILED SEPT. 24, 1915.
1,184,645.  Patented May 23, 1916.
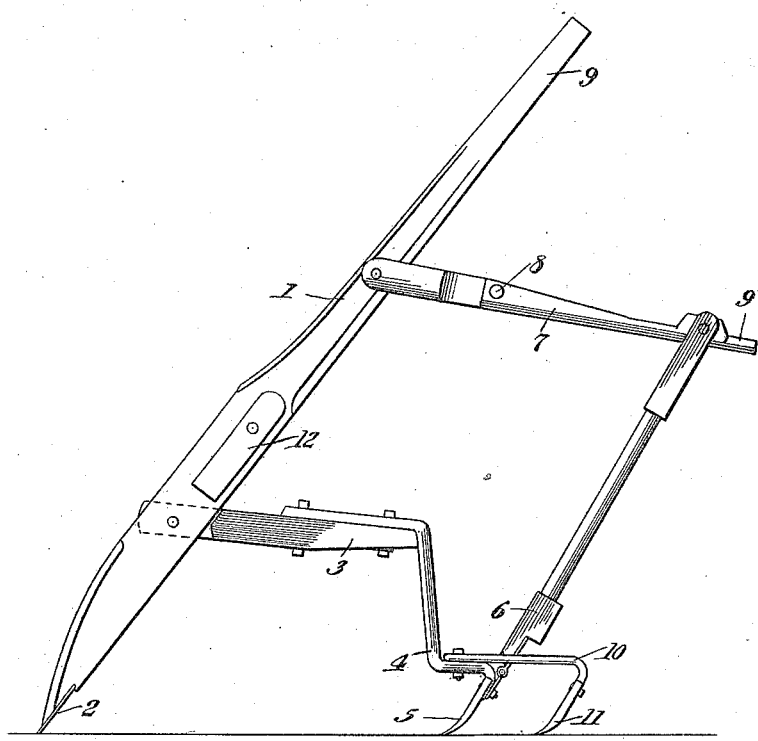
Witnesses
Louis A. Stabler
L. C. Wilcox
Inventor
David Himes,
By Victor J. Evans
Attorney

UNITED STATES PATENT OFFICE.

DAVID HIMES, OF MINERAL, ARKANSAS.

HAND-PLOW.

1,184,645.  Specification of Letters Patent.  Patented May 23, 1916.

Application filed September 24, 1915.  Serial No. 52,499.

*To all whom it may concern:*

Be it known that I, DAVID HIMES, a citizen of the United States, residing at Mineral, in the county of Sevier and State of Arkansas, have invented new and useful Improvements in Hand-Plows, of which the following is a specification.

This invention relates to hand plows and it consists in the novel features hereinafter described and claimed.

An object of the invention is to provide a plow of simple and durable structure adapted to be manually operated by a single operator for the purpose of cultivating the soil or planting grain. The plow is of light structure, consequently it may be readily handled by a single operator, and the plow may be used in places where space is limited as for instance, close to fences and in gardens and other places, where it would be impossible to operate a plow which is drawn by a draft animal.

In the accompanying drawing the figure is a side view of the plow.

The plow comprises a lever 1 which is preferably of wood. The said lever is provided at its lower end with a metallic toe 2 adapted to have contact with the ground when the plow is in use, and which protects the lower end of the lever against wear. A beam 3 is pivoted to the intermediate portion of the lever 1 and a standard 4 is attached to the said beam and extends beyond the rear end thereof. A suitable cultivator shovel 5 may be attached to the rear end of the said standard. A bar 6 is hingedly connected at its lower end with the rear end of the standard and at its upper end the said bar is pivotally connected with the intermediate portion of a rod 7. The forward end of the rod 7 is pivotally connected with the upper intermediate portion of the lever 1. The rod 7 is provided at a point between its ends with a cross handle 8 and the rear end of the said rod is fastened into a handle grip 9'. A yoke 10 may be connected with the lower rear portion of the standard 4 and the said yoke carries at its ends shovels 11 which are adapted to be used for the purpose of covering seed when the device is used as a planter as hereinafter described. A stop 12 is mounted upon the lever 1 at a point between the points of connection of the beam 3 and the rod 7 with the said lever and the lower end portion of the said stop 12 projects into the path of movement of the beam 3 and limits the swinging movement of the beam with relation to the lever whereby strain is relieved upon the pivot which connects the beam with the lever during the operation of the plow. Clips 13 and 14 are mounted upon the bar 6, the clip 13 being approximately stationary with relation to the bar while the clip 14 may swing with relation to the same. A handle 9 is fashioned at the upper end of lever 1.

Having described the invention what is claimed is:—

1. A plow comprising a lever, a beam pivotally connected therewith and carrying a standard, a soil working member carried by the standard, a bar hingedly connected at one end with the standard and a rod pivotally connected with the bar and the lever.

2. A plow comprising a lever, a beam pivotally connected therewith and carrying a standard, soil working members carried by the standard, a bar pivotally connected with the standard, a rod pivotally connected with the standard and the lever, and a stop carried by the lever and having an end portion adapted to project into the path of movement of the beam.

3. A plow comprising a lever, a beam pivotally connected therewith and carrying a standard, soil working elements carried by the standard, a bar pivotally connected with the standard, and a rod pivotally connected with the bar and the lever and having handles located at the opposite sides of the bar.

In testimony whereof I affix my signature in presence of two witnesses.

DAVID HIMES.

Witnesses:
 THOS. L. KNOD,
 W. F. KNOD.

Copies of this patent may be obtained for five cents each, by addressing the "Commissioner of Patents, Washington, D. C."